(12) United States Patent
Stoeckle

(10) Patent No.: US 10,406,832 B2
(45) Date of Patent: Sep. 10, 2019

(54) METHOD AND PRINTER FOR INCREASING THE PRINT QUALITY OF A PRINTER

(71) Applicant: Océ Holding B.V., Venlo (NL)

(72) Inventor: Ulrich Stoeckle, Munich (DE)

(73) Assignee: Océ Holding B.V., Venlo (NL)

( * ) Notice: Subject to any disclaimer, the term of this patent is extended or adjusted under 35 U.S.C. 154(b) by 0 days.

(21) Appl. No.: 15/825,500

(22) Filed: Nov. 29, 2017

(65) Prior Publication Data

US 2018/0147861 A1 May 31, 2018

(30) Foreign Application Priority Data

Nov. 30, 2016 (DE) .................. 10 2016 123 115

(51) Int. Cl.
| | |
|---|---|
| *B41J 11/00* | (2006.01) |
| *B41J 2/045* | (2006.01) |
| *B41J 3/60* | (2006.01) |
| *B41J 2/21* | (2006.01) |
| *H04N 1/00* | (2006.01) |
| *H04N 1/23* | (2006.01) |

(52) U.S. Cl.
CPC ......... *B41J 11/008* (2013.01); *B41J 2/04558* (2013.01); *B41J 2/2135* (2013.01); *B41J 2/2146* (2013.01); *B41J 3/60* (2013.01); *B41J 11/0095* (2013.01); *H04N 1/00034* (2013.01); *H04N 1/00087* (2013.01); *H04N 1/00323* (2013.01); *H04N 1/00726* (2013.01); *H04N 1/00734* (2013.01); *H04N 1/00779* (2013.01); *H04N 1/2323* (2013.01); *H04N 2201/0082* (2013.01)

(58) Field of Classification Search
CPC .... B41J 11/008; B41J 2/04558; B41J 2/2135; B41J 11/0095
See application file for complete search history.

(56) References Cited

U.S. PATENT DOCUMENTS

| | | | |
|---|---|---|---|
| 2002/0196298 A1 | 12/2002 | Cheng et al. | |
| 2013/0257935 A1* | 10/2013 | Arakane | B41J 2/04508 347/8 |
| 2017/0368855 A1* | 12/2017 | Sender Beleta | B41J 25/308 |

FOREIGN PATENT DOCUMENTS

| | | |
|---|---|---|
| EP | 2008833 A1 | 12/2008 |
| EP | 2644402 A1 | 10/2013 |
| EP | 2848921 A1 | 3/2015 |

OTHER PUBLICATIONS

Foreign action for German application 10 2016 123 115.0 dated Aug. 14, 2017.

* cited by examiner

*Primary Examiner* — Julian D Huffman
(74) *Attorney, Agent, or Firm* — Schiff Hardin LLP

(57) ABSTRACT

A method to increase the print quality of a printer can include determining sensor data corresponding to a print image printed by a print head of the at least one print head of the printer onto the recording medium; determining, based on the sensor data, undulation information corresponding to unevenness of the recording medium, a distance between the one or more nozzles of the print head of the printer and the recording medium varying due to the unevenness; and printing, based on the undulation information, a subsequent print image with the print head of the printer. The printer can include at least one print head including one or more nozzles that are configured to fire ink droplets onto a recording medium to generate a print image on the recording medium.

11 Claims, 4 Drawing Sheets

METHOD AND PRINTER FOR INCREASING THE PRINT QUALITY OF A PRINTER

CROSS REFERENCE TO RELATED APPLICATIONS

This patent application claims priority to German Patent Application No. 102016123115.0, filed Nov. 30, 2016, which is incorporated herein by reference in its entirety.

BACKGROUND

The present disclosure relates to a method and a printing device for increasing the print quality of a printing device, in particular an inkjet printing device having a duplexer.

Inkjet printing device may be used for printing to recording media, for example paper. For this, one or more nozzles may be used in order to fire ink droplets onto the recording medium, and in order to thus generate a desired print image on the recording medium. The print quality of the inkjet printing device may thereby be negatively affected by an undulation of the recording medium to be printed to.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
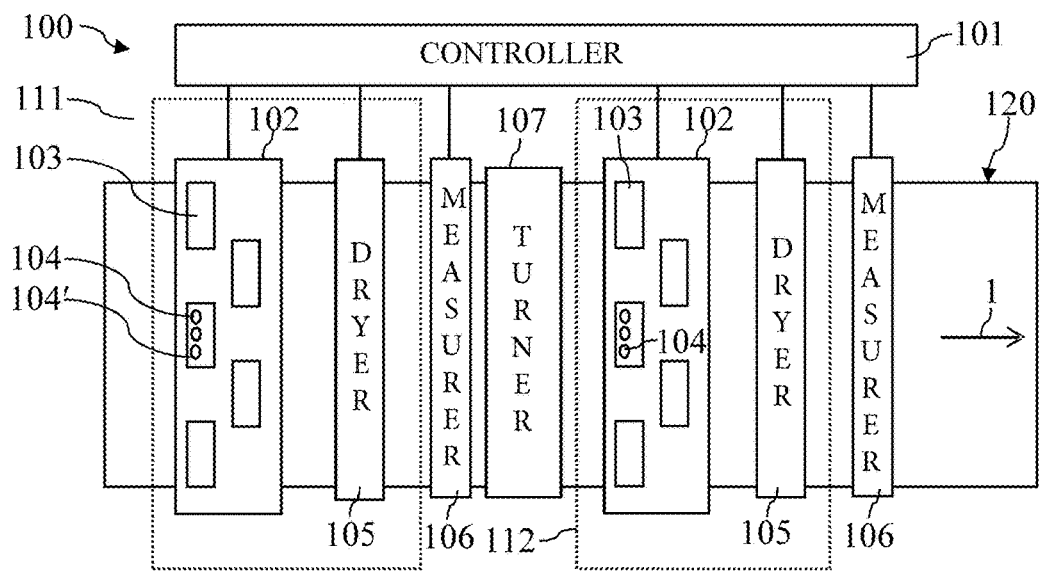
FIG. 1 illustrates a block diagram of an inkjet printer according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure relates to a method and a printing device (e.g. printer) via which negative effects on the print quality of a printing device (e.g. printer) may be reduced or entirely avoided due to the undulation (e.g. unevenness) of a recording medium.

According to an exemplary aspect of the present disclosure, a method is described for increasing the print quality of a printer. The printer includes at least one print head having one or more nozzles that are configured to fire ink droplets onto a recording medium to generate a print image on the recording medium. In an exemplary embodiment, the method includes the determination of sensor data (such as, for example, image data) with regard to a print image printed by a print head of the printer onto the recording medium. Moreover, the method can include the determination, on the basis of the sensor data, of undulation information (e.g. unevenness information) with regard to an unevenness of the recording medium. In this example, a distance between the one or more nozzles of a print head of the printer and the recording medium is varied due to the unevenness. The method can also include the printing, depending on the undulation information, of a subsequent print image with a print head of the printer.

According to an additional aspect, a printer is described for printing to a recording medium. The printer includes at least one print head having one or more nozzles that are configured to fire ink droplets onto the recording medium in order to generate a print image on the recording medium. Moreover, the printer includes at least one measurer that is configured to acquire sensor data with regard to a print image printed by a print head of the printer onto the recording medium. The measurer is additionally configured to determine undulation information with regard to unevenness of the recording medium on the basis of the sensor data. The printer is thereby designed such that a distance between the one or more nozzles of a print head of the printer and the recording medium is modified by the unevenness. The printer additionally includes a controller that is configured to activate a print head of the printer depending on the unevenness information in order to print a subsequent print image.

The present disclosure provides for an increase of the print quality of an inkjet printer, in particular with duplex printing. FIG. 1 shows a block diagram of an example of an inkjet printer 100 according to an exemplary embodiment having a first print group 111 for printing to a front side of a recording medium 120 and having a second print group 112 for printing to a back side of the recording medium 120. In an exemplary embodiment, the printer 100 illustrated in FIG. 1 is configured for a continuous printing, i.e. for printing to a "continuous" or web-shaped recording medium 120 (also designated as a "continuous feed"), but is not limited to continuous printing configurations. In an exemplary operation, the recording medium 120 is taken off a roll (the takeoff) and then supplied to the print groups 111, 112 of the printer 100. Via the print groups 111, 112, a print image is respectively applied onto the recording medium 120, and the printed recording medium 120 is taken up again on an additional roll (the takeup). Alternatively, the printed recording medium 120 may be cut into sheets or pages by a cutting device. In FIG. 1, the transport direction 1 of the recording medium 120 is represented by an arrow 1.

In the presented example, the print groups 111, 112 of the printer 100 respectively include a print bar 102. A print group 111, 112 can include multiple different print bars 102 for the printing with inks of different colors, for example black, cyan, magenta and/or yellow, but is not limited thereto. Each print bar 102 includes one or more print heads 103, wherein each print head 103 includes multiple nozzles 104. Each nozzle 104 is configured to fire ink droplets onto the recording medium 120. For example, a print head 103 may include 2558 or 5312 effectively utilized nozzles 104 that are arranged along one or more rows transversal to the transport direction 1 of the recording medium 120. The nozzles 104 in the individual rows may be arranged offset from one another. A row on the recording medium 120 may respectively be printed transversal to the transport direction 1 by means of the nozzles 104 of the print head 103 of a print bar 102. An increased image point resolution transversal to the transport direction 1 may be provided via the use of print heads 103 having multiple rows with transversally offset nozzles 104. In total, for example, K=12790 or K=26560 droplets may thus be fired along a row onto the recording medium 120 via a print bar 102 having 5 print heads 103, depicted in FIG. 1 (for example for a print width of approximately 56 cm at 600 dpi or at 1200 dpi (dots per inch).

Each print group 111, 112 may additionally include a dryer 105 that is configured to dry a print image. In particular, the print image applied onto the front side of the recording medium 120 by the first print group 111 may be dried by a dryer 105 before the recording medium 120 is turned in a turner 107 and then supplied to the second print group 112 for printing to the back side. The second print group 112 may also have a dryer 105 for drying the print image applied onto the back side.

In an exemplary embodiment, the printer 100 additionally includes a controller 101 (e.g. an activation hardware and/or a processor) that is configured to activate the actuators of the individual nozzles 104 of the individual print heads 103 of the first print group 111 and of the second print group 112 in order to apply print images onto the front side and the back side of the recording medium 120, depending on print data. In an exemplary embodiment, the controller 101 includes processor circuitry that is configured to perform one or more operations and/or functions of the control 101, including, for example, controlling the activation of the actuators.

A print group 111, 112 thus includes at least one print bar 102 having K nozzles 104 that may be activated with a defined line clock in order to print rows (transversal to the transport direction 1 of the recording medium 120) with K respective image points or K columns onto the recording medium 120. Due to the arrangement in multiple rows, the nozzles 104 of a print head 103 are typically activated with a (fixed) time offset from one another in order to print a row. In the depicted exemplary embodiment, the nozzles 104 are installed so as to be immovable or fixed in the printer 100, and the recording medium 120 is directed past the stationary nozzles 104 with a defined transport velocity (for example 80 m/min), but is not limited thereto. A specific nozzle 104 may print the image points of a corresponding column onto the recording medium 120, said column traveling in the transport direction 1. This configuration is called a 1:1 association, since precisely one nozzle 104 is associated with each column of a print image. A maximum of one ink ejection thus takes place per row via a specific nozzle 104.

Figure 2:
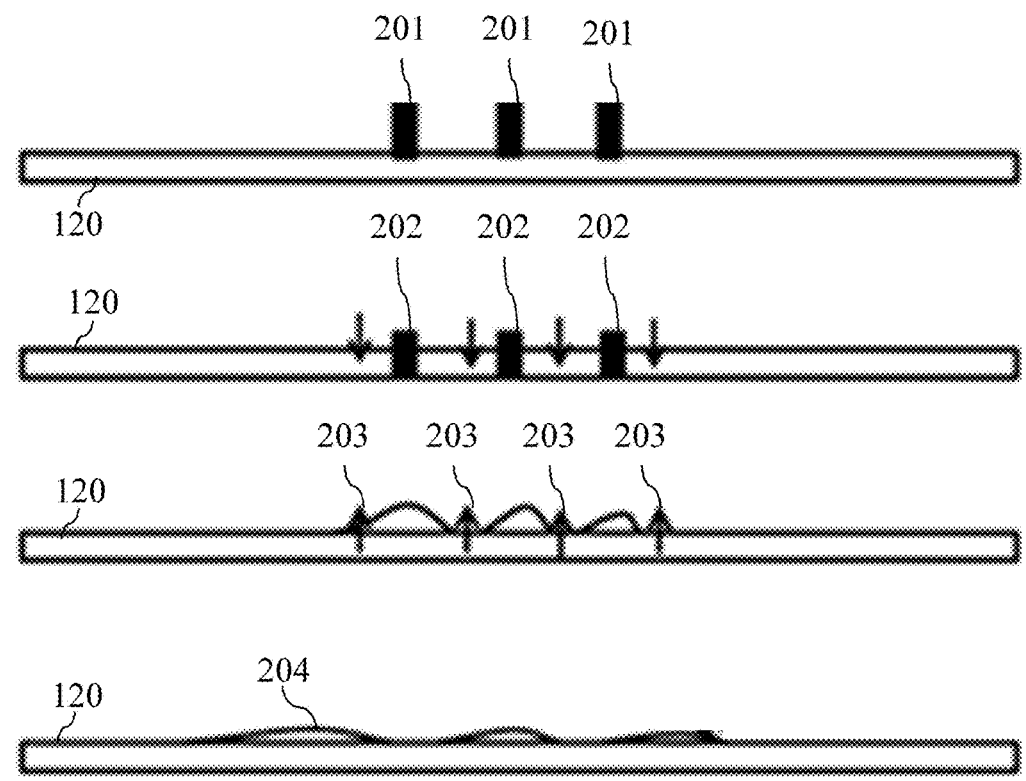
FIG. 2 illustrates an example of the development of undulation due to the printing of a print image according to an exemplary embodiment of the present disclosure.

To create a print image, ink is applied onto the recording medium 120 via the nozzles 104 of the printer 100. FIG. 2 shows an example of ink droplets 201 on the surface of a recording medium 120. The recording medium 120 at least partially absorbs the solvent (i.e. in particular water) of the ink droplets 201 (indicated by the arrow 202), which leads to the situation that the recording medium 120 expands, in particular in the transport direction, since the fibers of the recording medium 120 (paper) are aligned in this direction.

Fluids e.g. coating substances such as prime) are applied in part over the entire surface of the recording medium 120 so that substantial quantities of solvent are absorbed by the recording medium 120. Upon drying of the fluid (which is possibly applied over the entire surface or a portion thereof) in a dryer 105, the recording medium 120 may become undulating (e.g. uneven) due to the non-uniform evaporation of the solvent (indicated by the arrow 203). FIG. 2 shows an example of the recording medium 120 having an undulating (uneven) surface 204.

Moreover, locally applied ink droplets 201 of a print image that does not cover the entire surface may lead to a local absorption of fluid, and to a local expansion of the recording medium 120. The solvent (e.g. water) vaporizes during a drying process of the print image. At the locations of the recording medium 120 at which ink is applied, the additionally applied solvent of the ink evaporates first before additional fluid vaporizes, in particular water that was already in the recording medium 120 beforehand. On the other hand, the fluid of the recording medium 120 that was already present beforehand directly evaporates at unprinted locations of the recording medium 120. In a dryer 105, the recording medium 120 may shrink locally due to the removal of the fluid from the recording medium 120. Due to the non-uniform shrinkage at printed and unprinted locations, the recording medium 120 may become undulating.

An undulating recording medium 120 may negatively affect the printing process in a printer 100. In particular, in a duplex printer, the undulation of the recording medium 120 that is produced by the printing to the front side may negatively affect the subsequent printing to the back side. As a result of the undulation, a recording medium 120 has no uniform distance from a print head 103 of the printer 100, such that the positioning of droplets may be incorrect and distortions in the printed print image may occur.

Figure 3A:
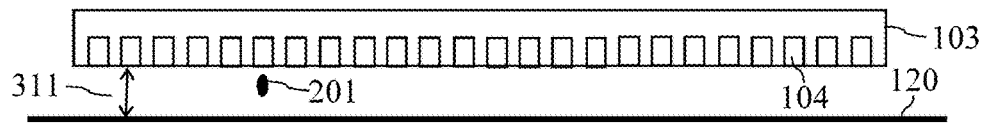
FIG. 3a illustrates examples of distance changes between a print head and the recording medium due to the undulation of a recording medium according to an exemplary embodiment of the present disclosure.
Figure 3A:
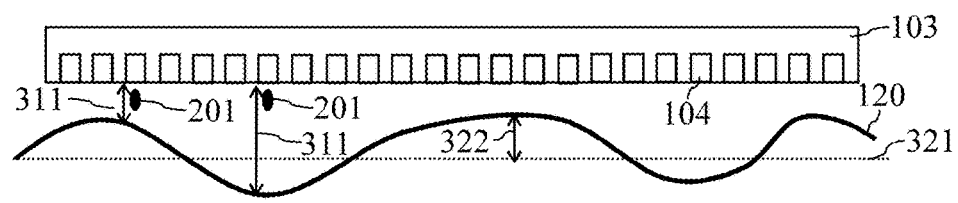

In the upper part, FIG. 3a shows a flat recording medium 120 that is directed past a print head 103. The transport direction 1 of the recording medium 120 thereby lies orthogonal to the image plane. The individual nozzles 104 eject ink droplets 201. Given a flat recording medium 120, the distance 311 between print head 103 and recording medium 120 is the same for all nozzles 104. Since the ink droplets 201 of the different nozzles 104 typically have the same flight velocity, the time of flight for all ink droplets 201 is thus the same, such that the ink droplets 201 ejected by the nozzles 104 of a print head 103 form individual image points 305 on a straight row 301 (see FIG. 3b).

In the lower part, FIG. 3a shows an undulating recording medium 120. In this instance, the distances 311 and 322 between the nozzles 104 and the recording medium 120 differ, such that the ink droplets 201 of the different nozzles 104 of a print head 103 have different times of flight and thus are positioned differently on the recording medium 120. Due to the movement of the recording medium 120 in the transport direction 1, the different times of flight lead to a distortion of a row 301 of a print image in the transport direction 1. In particular, as depicted in the lower part of FIG. 3b, the undulation of the recording medium 120 is transformed into an undulation of printed rows 301. The row 301 thereby has a straight reference line or straight center line 303 around which the row 301 meanders depending on the undulation of the recording medium 120. The row 301 has varying distances 304 from the straight reference line 303. The distance 304 of an image point 305 from the straight reference line 303 thereby typically depends on the distance 311 or 322 of the corresponding nozzle 104 from the recording medium 120.

In an exemplary embodiment, to compensate for a droplet positioning error that is caused by the undulation of a recording medium 120 to be printed, the undulation of the recording medium 120 may initially be determined. For example, the undulation measurer 106 depicted in FIG. 4 can be configured to determine the undulation of the recording medium 120. In an exemplary embodiment, the measurer 106 may, for example, be installed at the exit of the first print group 111 and/or at the exit of the second print group 112 of the printer 100, as depicted in FIG. 1. Alternatively or additionally, the measurer 106 may be arranged between the turner 107 and the input of the second print group 112, in particular when the undulation information determined in the measurer 106 should be used for printing in the second print group 112. In an exemplary embodiment, the measurer 106 includes processor circuitry that is configured to perform one or more operations and/or functions of the measurer 106, including, for example, determining the undulation and/or undulation information. In an exemplary embodiment, the measurer 106 is a measurement circuit 106 that determines an undulation and/or undulation information.

At the output of a print group 111, 112 of the printer 100, the recording medium 120 may have one or more regeneration print images 421 (for example with what are known as refresh lines) that may be used to regenerate the nozzles 104 of a print group 111 before printing a usable print image 422. Furthermore, the recording medium 120 may include one or more usable print images 422 that typically depend on usable print data from a print job.

The recording medium 120 may be directed in the transport direction 1 past an optical sensor 402. The optical sensor 402 can be configured to visually detect a portion of the surface of the recording medium 120. The acquisition region 412 of the sensor 402 may depend on the width of a print image 421, 422 on the recording medium 120. In an exemplary embodiment, the entire width of a print image 421, 422 may be acquired by the optical sensor 402. Furthermore, the acquisition region 412 of the optical sensor 402 may be configured such that at least one printed row of a print image 421, 422 may respectively be detected. For this purpose, the optical sensor 402 may include, for example, a camera (e.g. a line scan camera). The sensor data of the optical sensor 402 may be transmitted to the controller 401 of the measurer 106. In an exemplary embodiment, the sensor 402 includes processor circuitry that is configured to perform one or more operations and/or functions of the sensor 402.

In an exemplary embodiment, the controller 401 is configured to analyze the sensor data. In particular, on the basis of the sensor data, the controller 401 is configured to determine undulation information with regard to the undulation of the recording medium 120. Furthermore, the controller 401 may be configured to induce the optical sensor 402 to acquire sensor data. In particular, the controller 401 may determine a point in time at which the top sensor 402 acquires a one-dimensional image (one row, for example) or a two-dimensional image of the surface of the recording medium 120. It may thus be ensured that the acquired sensor data include one or more specific rows of a print image 421, 422. In an exemplary embodiment, the controller 401 includes processor circuitry that is configured to perform one or more operations and/or functions of the control 401, including, for example, analyzing sensor data and/or inducing the optical sensor 402 to acquire sensor data.

Figure 4:
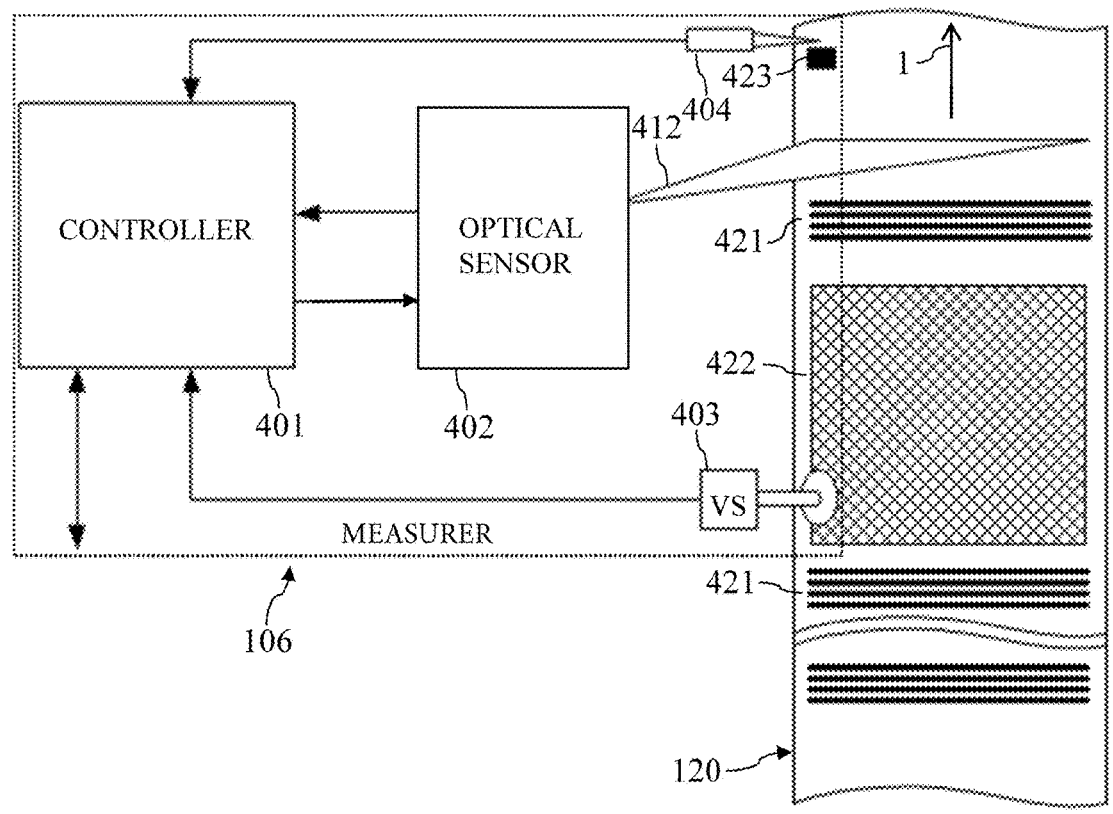
FIG. 4 illustrates an example of a measurer configured to determine the undulation of a recording medium according to an exemplary embodiment of the present disclosure.

In an exemplary embodiment, using a trigger sensor 404, the measurer 106 depicted in FIG. 4 may detect a trigger marking 423 on the recording medium 120 (for example a dark/light transition of the trigger marking 423 or a light/dark transition of the trigger marking 423). In other words, the trigger sensor 404 may be configured to generate trigger data with regard to a trigger marking 423 on the recording medium 120. The trigger marking 423 may have been printed by a print group 111, 112 on the recording medium 120. The trigger marking 423 may thereby have a predefined time and/or spatial clearance from a print image 421, 422. The trigger data may be used to synchronize the recording of the sensor data by the optical sensor 402 with a print image 421, 422. In an exemplary embodiment, the trigger sensor 404 includes processor circuitry that is configured to perform one or more operations and/or functions of the trigger sensor 404 (e.g. detect trigger marking).

The measurer 106 may include a velocity sensor 403 that is configured to acquire velocity data with regard to a transport velocity of the recording medium 120 in the transport direction 1. For example, the velocity sensor may include a frictional wheel that is driven by the movement of the recording medium 120. The controller 401 may determine and control a velocity of the recording of the individual image rows by the optical sensor 402 on the basis of the velocity data. In an exemplary embodiment, the velocity sensor 403 includes processor circuitry that is configured to perform one or more operations and/or functions of the velocity sensor 403 (e.g. acquire velocity data).

In an exemplary embodiment, the optical sensor 402 has a resolution transversal to the transport direction 1 of the recording medium 120 that corresponds to at least the number of nozzles 103 of a print bar 102 of the first print group 111 transversal to the transport direction 1 of the recording medium 120. Furthermore, in an exemplary embodiment, the optical sensor 402 is configured to record the surface of the recording medium 120 in the transport direction 1 with a sampling rate that corresponds to at least the resolution of a print image 421, 422 in the transport direction 1 of the recording medium 120.

Figure 3B:
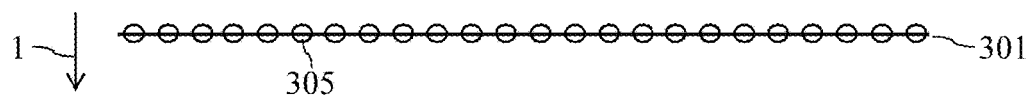
FIG. 3b, 3c illustrate examples of effects on the undulation of a recording medium on a row of a print image according to an exemplary embodiment of the present disclosure.
Figure 3B:
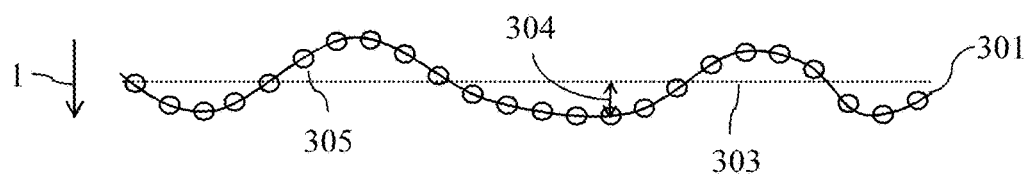

Undulation information with regard to the recording medium 120 may be determined with the measurer 106 shown in FIG. 4. In particular, print image rows 301 of a print image 421, 422, in particular of a regeneration print image 421, may be analyzed, as illustrated in FIG. 3b. For example, a straight reference line 303 may be determined for a row 301 of a print image 421. Furthermore, a distance 304 in the transport direction 1 from the straight center line 303 may be determined for some or all image points 305 or columns of the row 301. The distance 304 for an image point 305 or for a column indicates the dimension of the undulation of the recording medium 120 upon printing of the print image 421, 422. An undulation profile or a height profile of the recording medium 120 along the row 301 may thus be determined from the distances 304 for multiple image points 305 or columns.

Figure 3C:
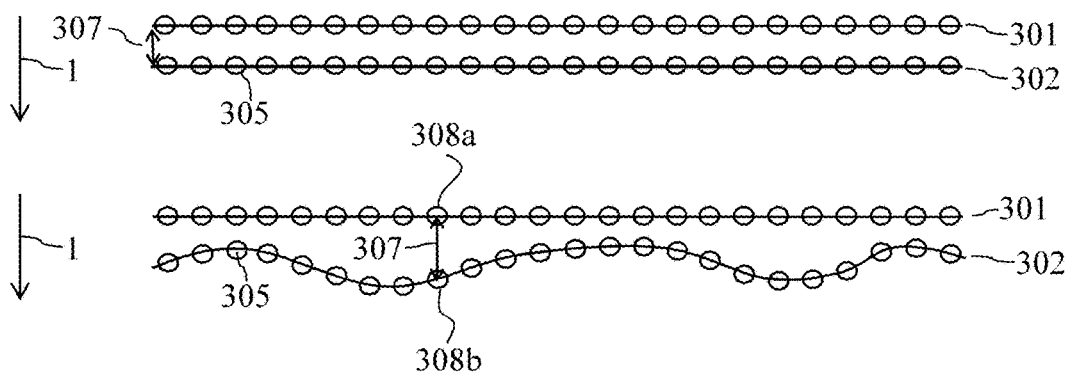

In an exemplary embodiment, as depicted in FIG. 3c, undulation information with regard to the undulation of the recording medium 120 upon printing a print image 421, 422 in the transport direction 1 may be determined via analysis of the distance 307 in transport direction 1 between the image points 305 of two successive rows 301, 302. In an exemplary embodiment, two image points 308a and 308b (designated in the following as image point pairs) are printed one after another from the same nozzle 304', and the distance 307 between these two image points 308a and 308b is measured to determine the undulation information. This distance measurement is implemented for all image point pairs of the corresponding nozzle. It is thereby noted that the time interval for all known pairs is identical. If the longitudinal distance between the image point pairs is constant over the print width, the recording medium 120 is not undulating. By contrast, if the longitudinal distance between the image point pairs varies over the print width, the recording medium 120 is undulating. As illustrated in the upper part of FIG. 3c, the image points 305 of two rows 301, 302 of a print image 421, 422 have a constant distance 307 in the transport direction 1 given a flat recording medium 120. However, due to the undulation of the recording medium 120 it may be the case that the distance 311 between a nozzle 104 and the recording medium 120 is different for the printing of the image point 305 of the first row 301 and for the printing of the image point 305 of the second row 302. This leads to times of flight of the ink droplets 201 that are of different lengths, and thus to a displacement of the relative positioning of the image points 305 in the transport direction 1, i.e. to a change of the distance 307 in the transport direction 1. This is illustrated by way of example in the lower part of FIG. 3c. An undulation profile or a height profile of the recording medium 120 along a column in the transport direction 1 may be determined via the analysis of the distance 307 between the image points 305 of a column of the print image 421, 422.

In an exemplary embodiment, via the analysis of the distances 304 from a straight reference line 303 for individual rows 301, and/or of the distances 307 between image points 305 of different rows 301, 302, a one-dimensional and/or two-dimensional undulation profile or height profile of the recording medium 120 may be created upon printing to a print image 421, 422. In particular, the undulation or the height of the recording medium 120 may be determined for each image point 305 of a print image 421, 422. For example, the undulation may be indicated by the height of the recording medium at the corresponding image point 305. In particular, a height profile of the recording medium 120 may be determined for the different rows 301 of a print image 421, 422, as illustrated in the lower part of FIG. 3a, which height profile indicates the height 322 of the recording medium 120 relative to a reference height 321, wherein the reference height 321 is an average height of the recording medium 120, for example.

In an exemplary embodiment, the undulation information determined by the measurer 106 may be used in the first print group 111 and/or in the second print group 112 to increase the print quality of a print image 421, 422 to be printed. The undulation information may be transmitted from the measurer 106 to the controller 101 of the printer 100. The controller 101 may then implement one or more compensation measures in order to take the undulation of the recording medium 120 into account upon printing a print image 421, 422, and in order to at least partially compensate for effects of the undulation of the recording medium 120 on the print image 421, 422.

As an example of a compensation measure, the positioning error of the image points 305 that is produced by the undulation of the recording medium 120, i.e. the undulation information, may be taken into account in the rastering process of a print image 421, 422 to be printed. Furthermore, the positioning error of the image points 305, meaning the undulation information, may be taken into account following the rastering process and/or in the activation of a print head 103. For example, the individual nozzles 104 of a print head 103 may be activated with different time offsets in order to at least partially compensate for the different times of flight of the ink droplets 201 due to the undulation.

The droplet positioning, and therefore the print image quality, may thus be increased. Furthermore, the consideration of the undulation of a recording medium 120 enables the use of different types of recording media 120, in particular of different paper types, in a printer 100.

Figure 5:
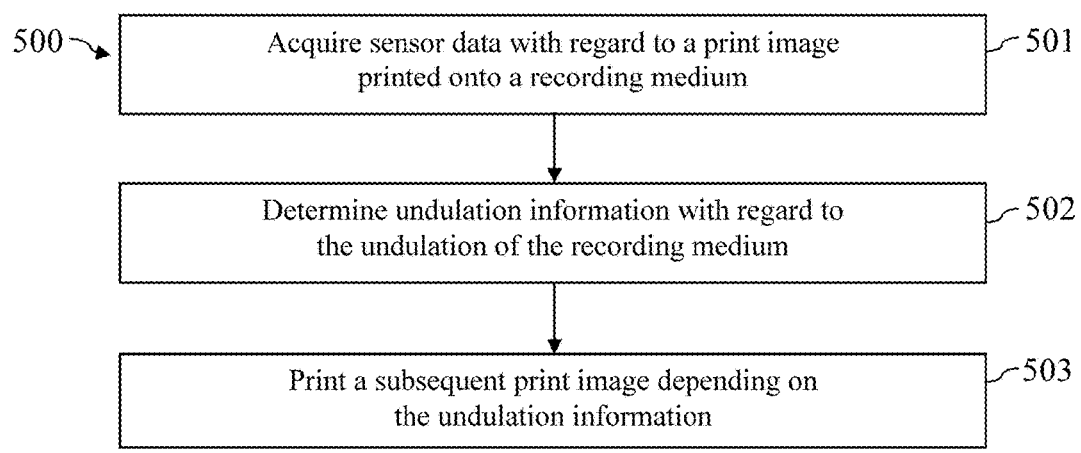
FIG. 5 illustrates a flowchart of a method to increase the print quality of an inkjet printer according to an exemplary embodiment of the present disclosure.

FIG. 5 shows a flowchart of an example of a method 500 for increasing the print quality of a printer 100 according to an exemplary embodiment of the present disclosure. In an exemplary embodiment, the printer 100 includes at least one print head 102 having one or more nozzles 104 that are configured to fire ink droplets 201 onto a recording medium 120, in particular onto a paper-based recording medium, in order to generate a print image 421, 422 on the recording medium 120.

In an exemplary embodiment, the method 500 includes the determination 501 of sensor data with regard to a print image 421, 422 printed by a print head 102 of the printer 100 onto the recording medium 120. For example, the print image 421, 422 may have been printed by a second print group 112 of the printer 100 onto a back side of the recording medium 120. The recording medium 120 may thereby have already passed through a first print group 111 beforehand, at which a front side of the recording medium 120 has been printed. Due to the printing to the front side of the recording medium 120, the recording medium 120 may then exhibit unevenness or an undulation at the input of the second print group 112. Such undulations of the recording medium 120 at the input of the second print group 112 may negatively affect the quality of a print image 421, 422 that is printed on the back side of the recording medium 120 in the second print group 112.

The sensor data may be determined by an optical sensor 402, for example by an image camera or by a line scan camera. The sensor data may thus in particular have image data with regard to the printed print image 421, 422 on the recording medium 120. The sensor data may thereby be synchronized with the print image 421, 422 (for example using the trigger data and/or velocity data described above). To which region of a recording medium 120 the respective sensor data refer may thus be determined.

In an exemplary embodiment, the method 500 also includes the determination 502 of undulation information with regard to unevenness of the recording medium 120 on the basis of the sensor data. The printer 100 is thereby typically mechanically designed such that a distance 311 between the one or more nozzles 104 of a print head 103 of the printer 100 and the recording medium 120 is varied due to the unevenness of the recording medium 120. A changing distance 311 between nozzles 104 and recording medium 120 leads to variations of the time of flight of the ink droplets 201, and thus to positioning errors in the printed print image 421, 422. These positioning errors may be detected on the basis of the sensor data. Furthermore, these positioning errors, in particular a dimension of the positioning errors, enable conclusions about the unevenness of the recording medium 120. Undulation information may thus be determined on the basis of the sensor data.

Moreover, the method 500 can include the printing 503 of a subsequent print image 421, 422 with a print head 103 of the printer 100 depending on the undulation information. In this example, the undulation information with regard to unevenness of the recording medium 120 may be taken into account in the printing of a subsequent print image 421, 422. The print quality of the subsequent print image 421, 422 may thus be increased. In particular, positioning errors of the image points 305 may thus be reduced and/or avoided in the subsequent print image 421, 422.

For example, print image distortions on a back side of a print image 421, 422 that may arise in a second print group 112 of the printer 110 may thus be reduced. For this purpose, the undulation information may, for example, be determined by a measurer 106 at the output of the second print group 112 and be taken into account in the printing in the second print group 112. Alternatively or additionally, the undulation information may be determined by a measurer 106 at the input of the second print group 112 and be taken into account in the printing in the second print group 112.

A method is thus described in which sensor data are determined with regard to a print image 421, 422 printed on a recording medium 120 by a printer 100, and in which undulation information is determined based thereupon with regard to unevenness of the recording medium 120. The undulation information may be taken into account for the printing of a subsequent print image 421, 422 in order to increase the print quality of the printer 100.

The printer 100 may be configured to move the recording medium 100 and a first print head 103 of the printer 100 relative to one another in a transport direction 1. In particular, the recording medium 100 may be directed in the transport direction 1 past the first print head 103. Image points 305 of a column of the print image 421, 422 may then be printed along the transport direction 1 with a nozzle 104 of the first print head 103 (for example on the back side of the recording medium 120). If applicable, the nozzle 104 may thereby be arranged rigid above the column of the print image 421, 422 and print the image points 305 of this column in a 1:1 relation.

The sensor data with regard to the printed print image 421, 422 may then indicate the positions of the image points 305 of the column on the recording medium 120. For example, image data with regard to the printed column may be acquired and analyzed in order to determine the positions, in particular the relative positions, of the image points 305 of the column. The undulation information may then be determined based on the positions of the image points 305 of the column. For example, distances between the image points 305 of the column may be determined on the basis of the positions of said image points 305 of the column. A height profile of the recording medium 120 along the column may then be determined as undulation information based on the distances 307 between the image points 305 of the column.

The printer 100 may be configured to print a plurality of image points 305 of a row 301 of the print image 421, 422 transversal to the transport direction 1 with a corresponding plurality of nozzles 104 of the first print head 103. As already presented above, the nozzles 104 may be installed in a fixed manner so that each nozzle 104 prints at most precisely one image point 305 in a row 301.

The sensor data, in particular the image data, may indicate positions of the plurality of image points of the row 301 on the recording medium 120. The undulation information may then be determined on the basis of the positions of the plurality of image points 305 of the row 301. In particular, a straight reference line 303, for example a straight center line, may be determined along the row 301 on the basis of the positions of the plurality of image points 305. The distance 304 of the position of an image point 305 from the straight reference line 303 may then respectively be determined for the plurality of image points 305. A height profile of the recording medium 120 along the row 301 may also be determined as undulation information on the basis of the distances 304 for the plurality of image points 305 of the row 301.

Undulation information, for example a height profile of the recording medium 120 in the transport direction 1 and/or transversal to the transport direction 1, may thus be reliably determined via the graphical evaluation.

For the printing 503 of the subsequent print image 421, 422, said subsequent print image 421, 422 may be rastered based on the undulation information. The print data may thus be adapted in order to at least partially compensate for the undulation of the recording medium 120. For example, the data of the subsequent print image 421, 422 may be rastered such that a distorted print image 421, 422 would be created on the recording medium 120 if said recording medium 120 were flat. The distortions may thereby be "inverse" to the height profile or the undulation of the recording medium 120. When the recording medium 120 actually has the height profile indicated by the undulation information, it may thus be produced that an undistorted print image 421, 422 may be printed.

Alternatively or additionally, for the printing 503 of the subsequent print image 421, 422 the print head 103 may be activated, depending on the undulation information, to eject ink droplets 201 for said subsequent print image 421, 422. In particular, activation points in time may be adapted depending on the undulation information for the activation of the one or more nozzles 104 of the print head 103. For example, activation points in time may be individually brought forward or backward (depending on the height profile of the recording medium 120) in order to at least partially compensate for positioning errors of the image points 305 in the subsequent print image 421, 422.

Regeneration print images 421 (what are known as refresh lines), which typically have a line-shaped print pattern transversal to the transport direction 1, are particularly well suited to the determination of the undulation information. The undulation information may be reliably and precisely determined using the printed lines.

In an exemplary embodiment, a consideration of the undulation information may possibly take place only when the undulation information indicates that the undulation of the recording medium 120, or the height 322 of the recording medium 120 relative to a reference height 321, exceeds a specific, predefined threshold.

In an exemplary embodiment, the printer 100 includes at least one print head 103 having one or more nozzles 104 that are configured to fire ink droplets 201 onto the recording medium 120 in order to generate a print image 421, 422 on the recording medium 120. The printer 100 may additionally include at least one measurer 106 that is configured to acquire sensor data with regard to a print image 421, 422 printed by a print head 103 of the printer 100 on the recording medium 120. The measurer 105 is additionally configured to determine undulation information with regard to unevenness of the recording medium 120 on the basis of the sensor data. The printer 100 is thereby typically designed such that a distance 311 between the one or more nozzles 104 of a print head 103 of the printer 100 and the recording medium 120 is varied due to the unevenness. The varying distance 311 may then affect a printed print image 421, 422. The undulation information may then indicate this varying distance 311 between the one or more nozzles 104 of the print head 103 of the printer 100 and the recording medium 120, for example as a height profile of the recording medium 120.

Moreover, the printer 100 may include a controller 101 that is configured to activate a print head 103 of the printer 100 depending on the undulation information in order to print a subsequent print image 421, 422. The print quality of the printer 100 may thus be increased.

The printer 100 may in particular include a first print group 111, wherein the print head 103 for printing the print image 421, 422 that is used to determine the undulation information is arranged in the first print group 111. The recording medium 120 may then be conveyed from an input to an output of the first print group 111 in order to print a print image 421, 422 on the recording medium 120. The measurer 106 may be arranged at the output side with regard to the first print group 111 in order to determine the undulation information with regard to the recording medium 120.

The undulation information may be determined with the method 500 described in this document, i.e. on the basis of incorrect image point positionings. In particular, the undulation of the recording medium 120 that was already present at the input of the first print group 111 may thus be determined. The undulation information may then in particular be taken into account for the printing of a subsequent print image 421, 422 in the first print group 111.

Alternatively or additionally, the undulation information with regard to the recording medium 120 may be considered in a subsequent, second print group 112. For example, the first print group 111 may be configured to print a print image 421, 422 onto a front side of the recording medium 120. An undulation of the recording medium 120 may be produced via the application of inks and via the subsequent drying. The undulation may be determined by a measurer 106 at the output side with regard to the first print group 111. This means that the measurer 106 may be configured to determine the undulation information on the basis of a print image 421, 422 printed by the first print group 111 onto the front side.

The printer 100 may include a second print group 112 that is arranged at the output side with regard to the first print group 111 and that is configured to print a print image 421, 422 onto the back side of the recording medium 120. The controller 101 may then be configured to activate a print head 103 of the second print group 112 depending on the undulation information in order to print the subsequent print image 421, 422 onto the back side of the recording medium 120. A qualitatively high-grade duplex printing may thus be enabled. In particular, the height profile of a recording medium 120 may be determined precisely at the input of a second print group 112 and be taken into account in the printing within the second print group 112 in order to at least partially compensate for the height profile of the recording medium 120.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 transport direction
100 printer
101 controller of the printer 100
102 print bar
103 print head
104 nozzle
105 dryer
106 measurer
107 turner
111 print group (front side)
112 print group (back side)
120 recording medium
201 ink droplet
202 absorption process
203 swelling process
204 undulating surface
301-302 row
303 straight reference line
304 distance (from straight reference line 303)
305 image point
307 distance (between image points of a column)
311 distance (between nozzle and recording medium)
321 reference height
322 height (of the recording medium)
401 controller (of the measurer 106)
402 optical sensor
403 velocity sensor
404 trigger sensor
421 regeneration print image
422 usable print image
423 trigger marking
500 method to increase the print quality of a printer
501-503 method steps

The invention claimed is:

1. A method to increase the print quality of a printer having at least one print head including nozzles that are configured to fire ink droplets onto a recording medium to generate a print image on the recording medium, the method comprising:
   printing image points of a column of the print image along a transport direction with a nozzle of the nozzles of the print head and image points of a row of the print image transversal to the transport direction with a corresponding plurality of the nozzles;
   determining sensor data corresponding to a print image printed by the print head onto the recording medium, the sensor data being indicative of positions of the image points of the column on the recording medium and positions of the image points of the row on the recording medium;
   determining, based on the sensor data including the positions of the image points of the column and the positions of the image points of the row, undulation information corresponding to unevenness of the recording medium, the determining of the undulation information including: determining a straight reference line extending transversal to the transport direction and along the row based on the positions of the image points of the row, determining distances of the positions of the image points from the straight reference line, the distances extending in the transport direction, and determining a height profile of the recording medium along the row as the undulation information based on the distances for the image points of the row, wherein a distance between the nozzles of the print head of the printer and the recording medium varies due to the unevenness; and
   printing, based on the undulation information, a subsequent print image with the print head of the printer.

2. The method according to claim 1, wherein:
   the print head is stationary and has a fixed position, the printer being configured to move the recording medium relative to the print head of the printer in a transport direction.

3. The method according to claim 1, further comprising:
   determining distances between the image points of the column based on the positions of the image points of the column; and
   determining a height profile of the recording medium along the column as undulation information based on the distances between the image points of the column.

4. The method according to claim 3, wherein:
   the printer is configured to print a plurality of image points of a row of the print image transversal to the transport direction with a corresponding plurality of the one or more nozzles of the first print head;
   the sensor data is indicative of positions of the plurality of image points of the row on the recording medium; and
   the undulation information is determined based on the positions of the plurality of image points of the row.

5. The method according to claim 4, further comprising:
   determining a straight reference line along the row based on the positions of the plurality of image points;
   determining distances of the respective positions of the plurality of image points from the straight reference line; and
   determining a height profile of the recording medium along the row as undulation information based on the distances for the plurality of image points of the row.

6. The method according to claim 1, wherein, for the printing of the subsequent print image:
   the subsequent print image is rastered based on the undulation information;
   the print head is activated, based on the undulation information, to eject ink droplets to print the subsequent print image; and/or
   activation points in time for the activation of the one or more nozzles of the print head are adapted based on the undulation information.

7. A non-transitory computer-readable storage medium with an executable program stored thereon, wherein, when executed, the program instructs a processor to perform the method of claim 1.

8. A printer configured to print to a recording medium, the printer comprising:
   at least one print head having nozzles that are configured to fire ink droplets onto the recording medium to generate a print image on the recording medium, the generation of the print image including: moving the recording medium relative to the at least one print head in a transport direction; and printing image points of a column of the print image along the transport direction with a nozzle of the nozzles of the print head and image points of a row of the print image transversal to the transport direction with a corresponding plurality of the nozzles;
   a measurer that is configured to:
      acquire sensor data corresponding to the print image printed by the print head of the printer on the recording medium, the sensor data being indicative of positions of the image points of the column on the recording medium and positions of the image points of the row on the recording medium; and determine undulation information corresponding to unevenness of the recording medium based on the sensor data including the positions of the image points of the column and the positions of the image points of the row, the determining of the undulation information including: determining a straight reference line extending transversal to the transport direction and along the row based on the positions of the image points of the row, determining distances of the positions of the image points from the straight reference line, the distances extending in the transport direction, and determining a height profile of the recording medium along the row as the undulation information based on the distances for the image points of the row; and a controller that is configured to activate the print head of the printer based on the undulation information to print a subsequent print image.

9. The printer according to claim 8, wherein:

the printer comprises a first print group;

the print head arranged in the first print group and configured to print the print image, the undulation information being determined based on the print image;

the recording medium is conveyed from an input to an output of the first print group to print the print image onto the recording medium; and the measurer is arranged at the output side with respect to the first print group.

10. The printer according to claim 9, wherein:

the first print group is configured to print a print image onto a front side of the recording medium;

the printer comprises a second print group that is arranged at the output side with regard to the first print group and is configured to print a print image onto a back side of the recording medium;

the measurer is configured to determine the undulation information based on the print image printed by the first print group onto the front side of the recording medium; and the controller is configured to activate a print head of the second print group based on the undulation information to print the subsequent print image onto the back side of the recording medium.

11. The printer according to claim 9, wherein the print image applied onto the front side of the recording medium is printed by the first print group.

* * * * *